Patented Apr. 5, 1927.

1,623,876

UNITED STATES PATENT OFFICE.

LUDWIG KERN, OF BALTIMORE, MARYLAND.

PROCESS OF MAKING CEMENT.

No Drawing. Application filed December 22, 1925. Serial No. 77,379.

In a copending case, Serial No. 66,110 filed October 31, 1925, by myself and F. C. Kern, we have described and claimed a novel mode of preparing structural material such as bricks, blocks, tiles, as well as other molded articles, from a raw material consisting largely of sea sand mixed with more or less finely divided calcium carbonate (say about as fine as ordinary sand). In accordance with the procedure of such prior application, the initial naturally mixed material, containing preferably from about 30 to 60% of calcium carbonate or calcareous material and from 40 to 70% of silica such as sand, is first calcined at a low temperature sufficient to substantially decarbonate the calcium carbonate present, without producing any sintering of the material. The material is then ground to a fine powder, and is hydrated by being mixed with water, in amount sufficient to produce a stiff paste which can then be molded into blocks or other shapes, bricks, tiles and the like, the said materials thereafter being subjected to an induration treatment by the action of steam or carbon dioxide or both, preferably under a pressure of say 25 atmospheres, until the hardened blocks are completely indurated and cured.

The raw material after calcination or before calcination or both, can be subjected to a washing operation if desired to remove soluble salts, and the calcined material may contain for instance 60% of lime, 25% of silica, 5% of alumina (e. g. in the form of clay or partially decomposed feldspathic rock) 3% of magnesia and the like.

I have found by experimentation, that the molded articles produced in accordance with the said prior application can serve as a raw material for the production of hydraulic cement of good quality. The making of cement as will be readily understood furnishes a convenient outlet for any molded articles which become mis-shapen or broken or cracked or otherwise damaged in the manufacture of the blocks.

The blocks, prepared as in accordance with the disclosure of the said copending application, a brief description of which process has been given above, can if desired first be crushed or broken up more or less, say into fragments from the size of peas up to the size of goose eggs, using any suitable machinery for the purpose, and the bodies can then be subjected to a burning operation, after which they can be ground to a fineness corresponding to that of ordinary Portland cement. In some cases it is not necessary to crush the material at all before burning, although such operation is not precluded. The blocks, tiles, etc., can be burned without crushing, if it is desired to omit this step.

The burning operation referred to at this stage may be conducted in a tunnel kiln, say at a temperature of about 400 to 600° C., but temperatures substantially above 600° C., should be voided so far as possible, in order to leave in the calcined product about 9 to 11% of chemically combined water. The operation of passing the material through a tunnel kiln for burning may require several hours, in accordance with the well known practice of burning material in kilns of this character, which are well known to be economical as regards fuel.

The calcined material, whether previously crushed or not is then ground up to a fine powder, preferably of about the fineness of ordinary Portland cement (say until about 60 to 80% of the crushed material will pass through a bolting cloth having 200 meshes per linear inch).

The burned product upon analysis has been found to consist of a combination of calcium hydroxide, calcium monosilicate and calcium bisilicate, and probably also some tricalcium silicate.

For using the cement, the ordinary procedures well known in the Portland cement art can be employed, and the ordinary formulas for Portland cement mixtures can be generally followed.

It will be understood that the process of making cement will be the same, whether the induration treatment has been conducted with gases containing carbon dioxide, or with steam containing no appreciable amount of carbon dioxide, or with mixtures of such two kinds of gases. This fact is believed to be quite unexpected in view of the fact that the temperature stated is below that at which the decarbonation of calcium carbonate is complete or even substantially complete.

I claim:—

1. A process of making cement which comprises first making molded articles from mixtures of calcareous and siliceous materials, indurating such molded articles under steam pressure, burning the same at about 400 to 600° C., and reducing to a fine powder.

2. A process of making cement which comprises indurating sand-lime molded mixtures, under steam pressure, thereafter burning at about 400 to 600° C., and thereafter pulverizing.

3. A process which comprises burning indurated sand-lime shaped products, at about 400 to 600° C., said shaped products being made from a natural mixture of calcareous and siliceous material by calcining at a temperature too low to produce any substantial amount of sintering, pulverizing, slaking with enough water to leave a moldable mass, molding, indurating under pressure at steam heat.

In testimony whereof I affix my signature.

LUDWIG KERN.